(12) United States Patent
Zhang et al.

(10) Patent No.: US 12,308,646 B2
(45) Date of Patent: May 20, 2025

(54) POWER COMPENSATION CONTROL METHOD AND APPARATUS FOR HIGH-POWER MULTI-FUNCTIONAL EFFICIENT CHARGING SYSTEM

(71) Applicant: SHANDONG UNIVERSITY, Shandong (CN)

(72) Inventors: Chenghui Zhang, Jinan (CN); Gaotong Wu, Jinan (CN); Bin Duan, Jinan (CN); Jinqiu Song, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/032,958

(22) PCT Filed: Oct. 17, 2022

(86) PCT No.: PCT/CN2022/125717
§ 371 (c)(1),
(2) Date: Apr. 20, 2023

(87) PCT Pub. No.: WO2024/040724
PCT Pub. Date: Feb. 29, 2024

(65) Prior Publication Data
US 2024/0380208 A1 Nov. 14, 2024

(30) Foreign Application Priority Data

Aug. 22, 2022 (CN) .......................... 202211006979.4

(51) Int. Cl.
*H02J 3/18* (2006.01)
*H02M 1/00* (2006.01)
*H02M 5/297* (2006.01)
*H02M 7/81* (2006.01)

(52) U.S. Cl.
CPC .......... *H02J 3/1842* (2013.01); *H02M 1/0077* (2021.05); *H02M 5/297* (2013.01); *H02M 7/81* (2013.01)

(58) Field of Classification Search
CPC .... H02J 3/1842; H02M 1/0077; H02M 5/297; H02M 7/81
See application file for complete search history.

(56) References Cited

U.S. PATENT DOCUMENTS

2005/0248969 A1    11/2005   Lacaze
2017/0229972 A1*   8/2017   Cerqueira Pinto Bezerra
                        Varajão ................. H02M 7/797

FOREIGN PATENT DOCUMENTS

CN       105406708 A      3/2016
CN       109980761 A *   7/2019
(Continued)

OTHER PUBLICATIONS

Ayano and Inaba and Ogasawara; A Parallel Matrix Converter System; IEEE Annual Power Electronics Specialists Conference; Jul. 2006; 7 pages.*

(Continued)

*Primary Examiner* — Harry R Behm
(74) *Attorney, Agent, or Firm* — Oliff PLC

(57) ABSTRACT

A power compensation control method and apparatus for a high-power multi-functional efficient charging system. A topology structure of the charging system includes at least two parallel high frequency link matrix converters. The power compensation control method includes: calculating a difference between an input voltage phase of an $i^{th}$ converter and an ideal reference input current phase under a dq two-phase synchronous rotating coordinate system, where i is an odd number; calculating, according to the above difference, a required rotating phase angle of a space current vector of an $(i+1)^{th}$ converter, where by total instantaneous (Continued)

reactive power at input sides of the $i^{th}$ converter and the $(i+1)^{th}$ converter is zero; correspondingly rotating the vector, and judging a sector to which the rotated vector belongs; and generating a corresponding control pulse signal based on the corresponding sector and modulation ratio, so as to act on the $(i+1)^{th}$ converter to realize power compensation.

18 Claims, 4 Drawing Sheets

(56) References Cited

FOREIGN PATENT DOCUMENTS

| CN | 111431422 A | * | 7/2020 | |
| CN | 113141121 A | * | 7/2021 | ............ H02M 5/225 |
| CN | 113258793 A | | 8/2021 | |
| CN | 113346787 A | | 9/2021 | |
| CN | 114785181 A | * | 7/2022 | |

OTHER PUBLICATIONS

Dec. 20, 2022 International Search Report issued in International Patent Application No. PCT/CN2022/125717.
Dec. 20, 2022 Written Opinion issued in International Patent Application No. PCT/CN2022/125717.
Wen-lang Deng et al. "Bipolar Space Vector Pulse-Width Modulation of High Frequency Link Two-Stage Matrix Converter". Electric Machines and Control, Nov. 2013, vol. 17, No. 11, pp. 75-82.

* cited by examiner

POWER COMPENSATION CONTROL METHOD AND APPARATUS FOR HIGH-POWER MULTI-FUNCTIONAL EFFICIENT CHARGING SYSTEM

CROSS-REFERENCE TO RELATED APPLICATIONS

The present disclosure claims the benefit of priority of Chinese patent application No. 202211006979.4, entitled "POWER COMPENSATION CONTROL METHOD AND APPARATUS FOR HIGH-POWER MULTI-FUNCTIONAL EFFICIENT CHARGING SYSTEM", filed to China National Intellectual Property Administration on Aug. 22, 2022, the entire contents of which are incorporated herein by reference.

TECHNICAL FIELD

The present disclosure belongs to the technical field of efficient power conversion system control, and more particularly relates to a power compensation control method and apparatus for a high-power multi-functional efficient charging system.

BACKGROUND

The description in this section merely provides background information related to the present disclosure and does not necessarily constitute the prior art.

Electric cars have randomness and intermittence demands for charging, and the user charging behavior tends to be gathered without guidance and regulation and control, which will seriously impact a power grid, not only influencing power utilization balance but also generating harmonics to pollute the power grid, and consequently, the power quality is poor. A power battery not only needs to be charged by the power grid, and but also serves as flexible distributed stored energy to provide active and reactive power compensation or support for the power grid. A charging system serving as a core for interaction between the electric cars and the power grid can combine multiple functions, including converting power grid energy to charge the battery, converting battery energy to provide active and reactive power support for the power grid, and thus becomes a multi-functional charging system for the power battery.

Most of existing charging systems are based on unidirectional topology, which can only charge the battery but cannot feed the battery energy back to the power grid. A high frequency link matrix converter is based on single-stage topology, which has advantages of high energy density and conversion efficiency, isolated input and output, power bidirectional flow, etc. However, the inventor has found that there is an LC filter at a power conversion topology alternating-current side, so that phase deviation exists between an alternating voltage and an alternating current, and the offset is related to selected inductance and capacitance, resulting in that the high frequency link matrix converter can only compensate for fixed reactive power, and sometimes even cause overcompensation or undercompensation.

SUMMARY

In order to solve technical problems in the above background, the present disclosure provides a power compensation control method and apparatus for a high-power multi-functional efficient charging system, which cannot only increase the system capacity or power level, but also flexibly change the phase of a system grid-side voltage and current, thereby realizing rapid dynamic compensation for power of a power grid.

In order to realize the above objectives, the present disclosure adopts the following technical scheme:

The present disclosure, in a first aspect, provides a power compensation control method for a high-power multi-functional efficient charging system. A topology structure of the charging system is constituted by at least two parallel high frequency link matrix converters. The power compensation control method includes:

calculating a difference between an input voltage phase of an $i^{th}$ converter and an ideal reference input current phase under a dq two-phase synchronous rotating coordinate system, where i is an odd number;

calculating, according to the above phase difference, a required rotating phase angle of a space current vector of an $(i+1)^{th}$ converter, where by the required rotating phase angle, total instantaneous reactive power at input sides of the $i^{th}$ converter and the $(i+1)^{th}$ converter is zero;

correspondingly rotating the space current vector of the $(i+1)^{th}$ converter, and judging a sector to which the rotated space current vector belongs; and generating a corresponding control pulse signal based on the corresponding sector and modulation ratio, so as to act on the $(i+1)^{th}$ converter to realize power compensation.

As an implementation, according to a transformation matrix through which an abc three-phase static coordinate system is converted into a dq two-phase synchronous rotating coordinate system, the difference between the input voltage phase of the $i^{th}$ converter and the ideal reference input current phase is calculated.

As an implementation, a Phase A of the input voltage of the $i^{th}$ converter is an included angle between a d-axis of the dq two-phase synchronous rotating coordinate system and an a-axis of the abc three-phase static coordinate system.

As an implementation, the included angle between the d-axis of the dq two-phase synchronous rotating coordinate system and the a-axis of the abc three-phase static coordinate system is obtained through phase locking via a phase-locked loop.

As an implementation, the control pulse signal is generated based on a method for modulating a bipolar current space vector.

The present disclosure, in a second aspect, provides a power compensation control apparatus for a high-power multi-functional efficient charging system. A topology structure of the charging system is constituted by at least two parallel high frequency link matrix converters. The power compensation control apparatus includes:

a phase difference calculation module configured to calculate, under a dq two-phase synchronous rotating coordinate system, a difference between an input voltage phase of an $i^{th}$ converter and an ideal reference input current phase, where i is an odd number;

a vector rotating module configured to calculate, according to the above phase difference, a required rotating phase angle of a space current vector of an $(i+1)^{th}$ converter, where by the required rotating phase angle, total instantaneous reactive power at input sides of the $i^{th}$ converter and the $(i+1)^{th}$ converter is zero;

a sector judgment module configured to correspondingly rotate the space current vector of the $(i+1)^{th}$ converter, and judge a sector to which the rotated space current vector belongs; and a pulse modulation module configured to generate a corresponding control pulse signal based on the corresponding sector and modulation ratio, so as to act on the $(i+1)^{th}$ converter to realize power compensation.

As an implementation, according to a transformation matrix through which an abc three-phase static coordinate system is converted into a dq two-phase synchronous rotating coordinate system, the difference between the input voltage phase of the $i^{th}$ converter and the ideal reference input current phase is calculated.

As an implementation, a Phase A of the input voltage of the $i^{th}$ converter is an included angle between a d-axis of the dq two-phase synchronous rotating coordinate system and an a-axis of the abc three-phase static coordinate system.

As an implementation, the included angle between the d-axis of the dq two-phase synchronous rotating coordinate system and the a-axis of the abc three-phase static coordinate system is obtained through phase locking via a phase-locked loop.

As an implementation, the pulse modulation module generates the control pulse signal based on a method for modulating a bipolar current space vector.

Compared with the prior art, the present disclosure has the following beneficial effects:

(1) The power compensation control method for a high-power multi-functional efficient charging system according to the present disclosure can flexibly change the phase difference of the system grid-side voltage and current, which makes the phase the same rapidly, thereby completing power compensation dynamic control and achieving a unit power factor.

(2) The topology applied by the present disclosure can realize whole machine high power output through parallel connection of the plurality of medium-low-power converters, thereby enlarging the system capacity and achieving good expandability; and output-side serial connection can be controlled by the current phase, which reduces current ripples and prevents the ripples from damaging batteries. The power compensation control method is ingenious in design, realizes portability and can be widely popularized and applied to other types of power converters.

The advantages in additional aspects of the present disclosure will be set forth in part in the description below, parts of which will become apparent from the description below, or will be understood by the practice of the present disclosure.

BRIEF DESCRIPTION OF THE DRAWINGS

The accompanying drawings of the specification constituting a part of the present disclosure are used to provide a further understanding of the present disclosure. The exemplary examples of the present disclosure and descriptions thereof are used to explain the present disclosure, and do not constitute an improper limitation of the present disclosure.

FIG. 7 ($b$) is an input-side Phase A voltage and current of a second converter after rotation according to an example of the present disclosure.

DETAILED DESCRIPTION

The present disclosure is further described below by combining the accompanying drawings and the examples.

It should be pointed out that the following detailed descriptions are all illustrative and are intended to provide further descriptions of the present disclosure. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. As used herein, the singular form is intended to include the plural form, unless the context clearly indicates otherwise. In addition, it should further be understood that terms "include" and/or "comprise" used in this specification indicate that there are features, steps, operations, devices, components, and/or combinations thereof.

Example I

Figure 1:
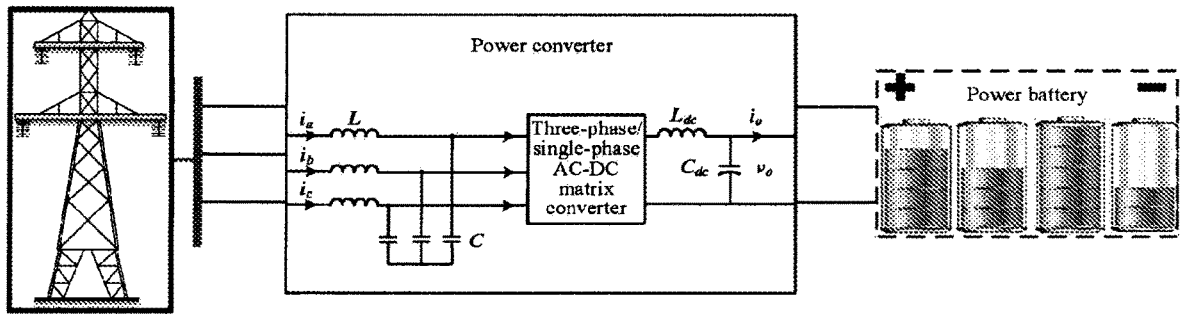
FIG. 1 is a schematic structural diagram of a charging system according to an example of the present disclosure.

Refer to FIG. 1, the example provides a power compensation control method for a high-power multi-functional efficient charging system. A topology structure of the charging system is constituted by parallel high frequency link matrix converters, as shown in FIG. 1. Thus, power bidirectional flow can be realized, thereby charging a power battery and also compensating for power grid power.

Figure 2:
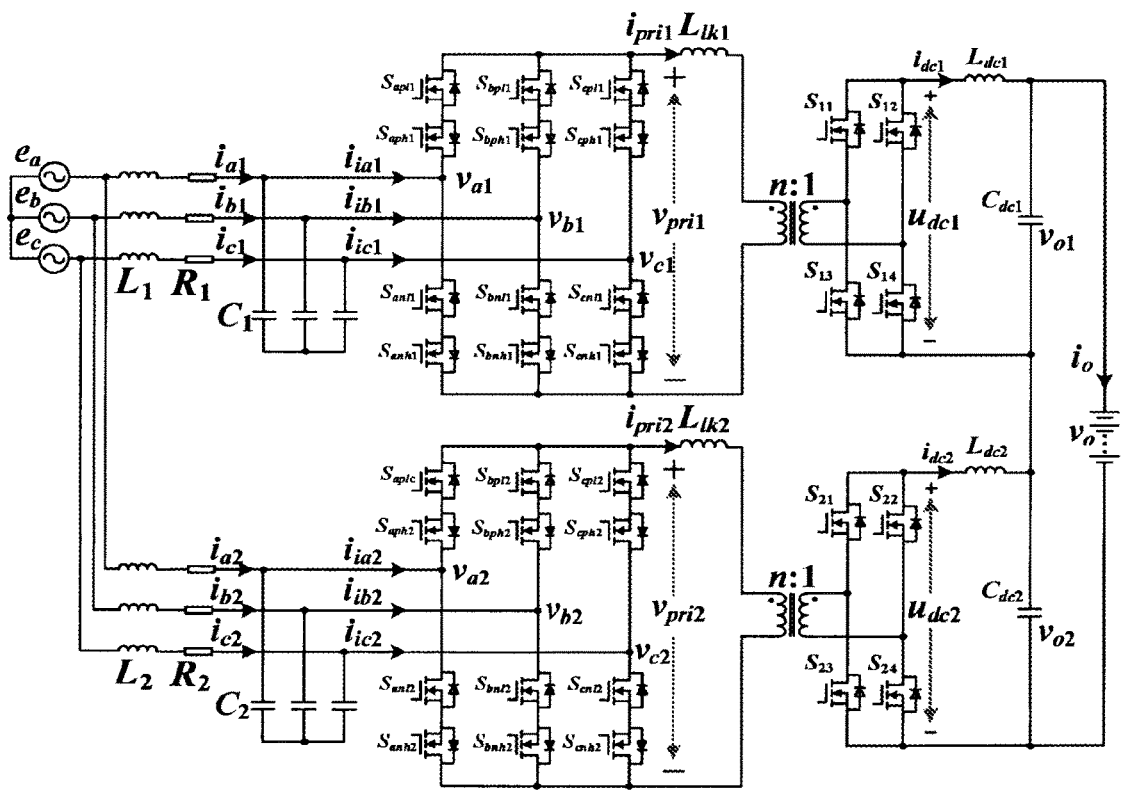
FIG. 2 is a structural topology diagram of modular parallel high frequency link matrix converters according to an example of the present disclosure.

A topology structure of a power converter is shown in FIG. 2. The whole system may be composed of a plurality of medium-low-power high frequency link matrix converters, and FIG. 2 shows a constituent structure of two high frequency link matrix converters. The two converters share a three-phase alternating-current supply and a load, and have the same connection mode with a plurality of converters, including: input side parallel connection and output side serial connection. The system further includes an input filter, a three-phase/single-phase AC-DC matrix converter, a high frequency transformer, a single-phase rectifier bridge and an output filter.

The three-phase/single-phase AC-DC matrix converter converts a three-phase industrial frequency alternating current into a single-phase high frequency alternating current, and has a frequency the same with a switching frequency of a power switching device MOSFET; when a direct-current-side load is charged, an LC low-pass filter on an alternating-current side can filter out higher harmonics introduced by the three-phase/single-phase AC-DC matrix converter; and the single-phase high frequency alternating current passes through the high frequency transformer (completing electrical isolation between the alternating-current side and the direct-current side), and is converted into the direct current through the single-phase rectifier bridge, then, high frequency harmonics in the direct current are filtered out by a direct-current-side LC low-pass filter, and finally, the high-quality direct current is formed to charge the battery.

To filter out the higher harmonics introduced by a three-phase/single-phase AC-DC matrix converter switch, an LC low-pass filter is added between a three-phase power grid and a three-phase/single-phase AC-DC matrix converter main circuit, thereby reducing harmonic pollution to the maximum extent. However, due to introduction of an input-side LC low-pass filter, the capacitive reactive component of the system will be increased, which causes that a grid-side current phase is ahead of a voltage phase, resulting in that a grid-side power factor is not 1, and only fixed compensation for reactive power can be completed.

Figure 3:
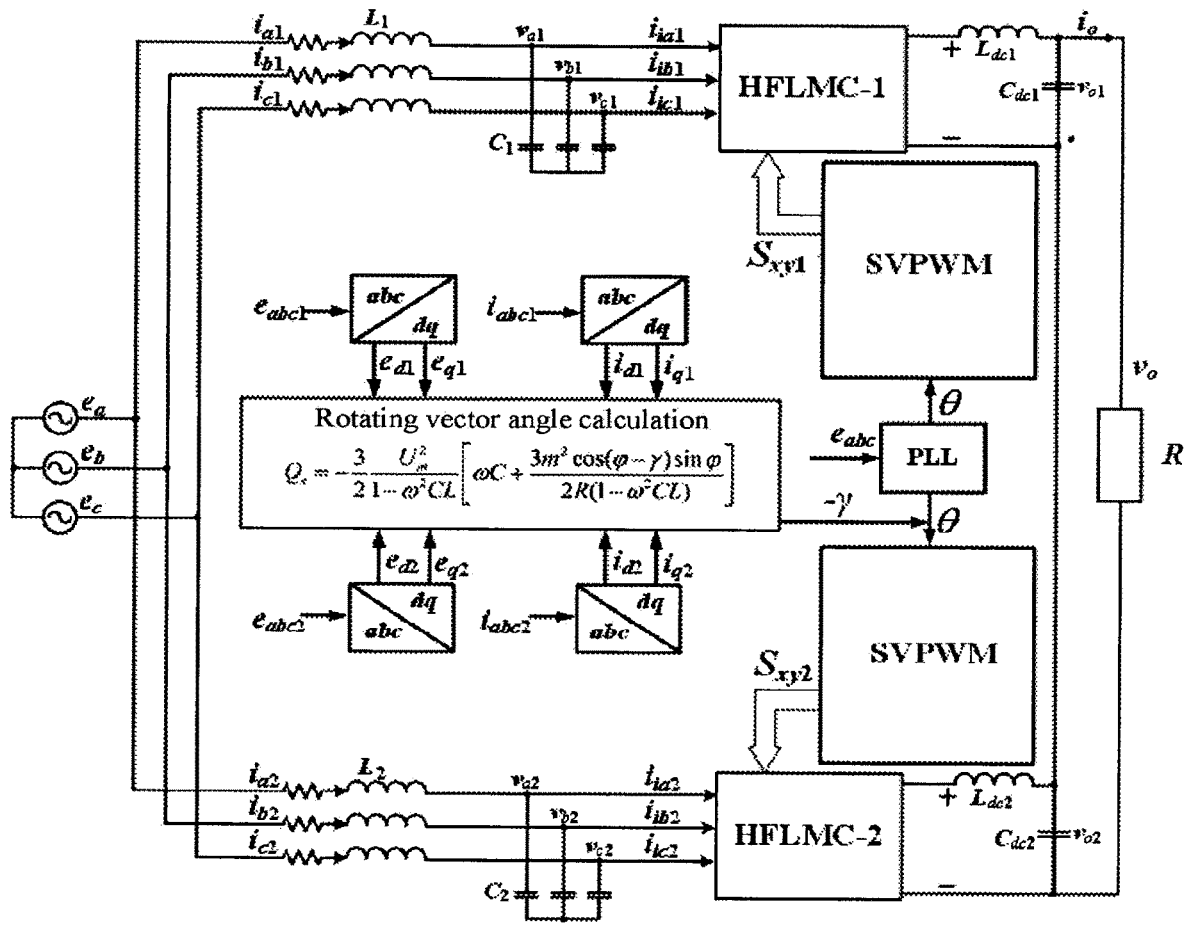
FIG. 3 is a functional block diagram of power compensation control for a high-power multi-functional efficient charging system according to an example of the present disclosure.

To make an alternating-current-side power grid power factor reach a unit power factor and realize flexible compensation for the reactive power, a novel compensation control method is invented, which performs rotation on space vectors of an even number of converters to change a grid-side voltage and current phase of the system, thereby realizing flexible compensation for the unit power factor. An integral control block diagram is as shown in FIG. 3.

According to a power compensation control principle:

(1) Under a dq two-phase synchronous rotating coordinate system, a difference between an input voltage phase of an $i^{th}$ converter and an ideal reference input current phase is calculated, where i is an odd number.

Specifically, a three-phase voltage actual value $e_{abc}$ and a three-phase current actual value $i_{abc}$ are subjected to Clark and Park transforms to obtain $e_d$, $e_q$, $i_d$, and $i_q$; and
a mathematical model of the high frequency link matrix converter is constructed:
when the three-phase power grid voltage is symmetric, based on the Kirchhoff's law, grid-side loop equations of the high frequency link matrix converter are constructed as:

$$\begin{bmatrix} e_a \\ e_b \\ e_c \end{bmatrix} = U_m \begin{bmatrix} \cos \omega t \\ \cos(\omega t - 2\pi/3) \\ \cos(\omega t + 2\pi/3) \end{bmatrix} \quad (1)$$

$$\begin{bmatrix} e_a \\ e_b \\ e_c \end{bmatrix} - \begin{bmatrix} v_a \\ v_b \\ v_c \end{bmatrix} = L\frac{d}{dt}\begin{bmatrix} i_a \\ i_b \\ i_c \end{bmatrix} \quad (2)$$

$$\begin{bmatrix} i_a \\ i_b \\ i_c \end{bmatrix} - \begin{bmatrix} i_{ia} \\ i_{ib} \\ i_{ic} \end{bmatrix} = C\frac{d}{dt}\begin{bmatrix} v_a \\ v_b \\ v_c \end{bmatrix} \quad (3)$$

$$\begin{bmatrix} i_{ia} \\ i_{ib} \\ i_{ic} \end{bmatrix} = m i_{dc} \begin{bmatrix} \cos(\omega t + \varphi) \\ \cos(\omega t + \varphi - 2\pi/3) \\ \cos(\omega t + \varphi + 2\pi/3) \end{bmatrix} \quad (4)$$

$$u_{dc} = m \begin{bmatrix} \cos(\omega t + \varphi) \\ \cos(\omega t + \varphi - 2\pi/3) \\ \cos(\omega t + \varphi + 2\pi/3) \end{bmatrix}^T \begin{bmatrix} v_a \\ v_b \\ v_c \end{bmatrix} \quad (5)$$

where $e_a$, $e_b$ and $e_c$ denote power grid voltages, $U_m$ denotes a three-phase power grid voltage amplitude, $\omega$ denotes a power grid angular speed, $i_a$, $i_b$ and $i_c$ denote power grid currents, $i_{ia}$, $i_{ib}$ and $i_{ic}$ denote input currents of the three-phase/single-phase AC-DC matrix converter, $v_a$, $v_b$ and $v_c$ denote three bridge arm mid-point voltages of the three-phase/single-phase AC-DC matrix converter, $i_{dc}$ denotes an output current of a diode rectifier bridge, $u_{dc}$ denotes an output voltage of the diode rectifier bridge, m denotes a modulation ratio of the three-phase/single-phase AC-DC matrix converter under an abc three-phase static coordinate system, L denotes input filter inductance, C denotes input filter capacitance, and $\varphi$ denotes a difference between an input voltage phase and an ideal reference input current phase.

According to a transformation matrix through which the abc three-phase static coordinate system is converted into the dq two-phase synchronous rotating coordinate system, the difference between the input voltage phase of the $i^{th}$ converter and the ideal reference input current phase is calculated.

A Phase A of the input voltage of the $i^{th}$ converter is an included angle between a d-axis of the dq two-phase synchronous rotating coordinate system and an a-axis of the abc three-phase static coordinate system.

The included angle between the d-axis of the dq two-phase synchronous rotating coordinate system and the a-axis of the abc three-phase static coordinate system is obtained through phase locking via a phase-locked loop.

Specifically, the phase-locked loop (PLL) calculates the included angle θ between the a-axis of the three-phase static coordinate system and the d-axis of the two-phase rotating coordinate system; and
the abc three-phase static coordinate system is converted into the dq two-phase synchronous rotating coordinate system, which adopts the transformation matrix T:

$$T = k \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \\ \sqrt{2}/2 & \sqrt{2}/2 & \sqrt{2}/2 \end{bmatrix} \quad (6)$$

where θ is the included angle between the a-axis of the three-phase static coordinate system and the d-axis of the two-phase rotating coordinate system and is in the value range: $0 \le \theta \le 2\pi$; and considering that power is not changed before and after conversion, an equi-power transformation matrix is adopted, and thus $k=\sqrt{2/3}$ is selected.

Through Clark and Park transform modules, the above equations can be converted into:

$$\begin{bmatrix} e_d \\ e_q \end{bmatrix} = \sqrt{\frac{3}{2}} U_m \begin{bmatrix} \cos\varphi \\ -\sin\varphi \end{bmatrix} \quad (7)$$

$$\begin{bmatrix} e_d \\ e_q \end{bmatrix} - \begin{bmatrix} v_d \\ v_q \end{bmatrix} = L\frac{d}{dt}\begin{bmatrix} i_d \\ i_q \end{bmatrix} + \omega L \begin{bmatrix} 0 & -1 \\ 1 & 0 \end{bmatrix}\begin{bmatrix} i_d \\ i_q \end{bmatrix} \quad (8)$$

$$\begin{bmatrix} i_d \\ i_q \end{bmatrix} - \begin{bmatrix} i_{id} \\ i_{iq} \end{bmatrix} = C\frac{d}{dt}\begin{bmatrix} v_d \\ v_q \end{bmatrix} + \omega C \begin{bmatrix} 0 & -1 \\ 1 & 0 \end{bmatrix}\begin{bmatrix} v_d \\ v_q \end{bmatrix} \quad (9)$$

$$\begin{bmatrix} i_{id} \\ i_{iq} \end{bmatrix} = \sqrt{\frac{3}{2}} m i_{dc} \begin{bmatrix} \cos\varphi \\ \sin\varphi \end{bmatrix} \quad (10)$$

$$u_{dc} = \sqrt{\frac{3}{2}} m [\cos\varphi \ \sin\varphi]\begin{bmatrix} v_d \\ v_q \end{bmatrix} \quad (11)$$

where $e_d$ and $e_q$ denote an active component and a reactive component of the power grid voltage, $i_d$ and $i_q$ denote an active component and a reactive component of the power grid current, $i_{id}$ and $i_{iq}$ denote an active component and a reactive component of the input current of the three-phase/single-phase AC-DC matrix converter, and $v_d$ and $v_q$ denote an active component and a reactive component of the bridge arm mid-point voltage of the three-phase/single-phase AC-DC matrix converter.

To further discuss the influences of θ on various components in the system, direct current analysis is performed on various dynamic elements in the system, that is, a capacitance element is kept open, an inductance element is kept short-circuited, and thus, the direct-current characteristics of the system can be obtained.

The equation (8) and the equation (9) are combined to obtain $$\begin{cases} e_d - v_d = L\frac{di_d}{dt} - \omega L i_q \\ e_q - v_q = L\frac{di_q}{dt} + \omega L i_d \\ i_d - i_{id} = C\frac{dv_d}{dt} - \omega C v_q \\ i_q - i_{iq} = C\frac{dv_q}{dt} + \omega C v_d \end{cases} \quad (12)$$

When a grid-side d-axis current change rate is $$\frac{di_d}{dt} = 0$$

and a main circuit q-axis voltage change rate is $$\frac{dv_q}{dt} = 0,$$

the equation (12) is changed into $$\begin{cases} e_d - v_d = -\omega L i_q \\ i_q - i_{iq} = \omega C v_d \end{cases} \quad (13)$$

According to the equation (13), a grid-side q-axis current component can be obtained through reorganization as $$i_q = \frac{1}{1 - \omega^2 CL}(i_{iq} - \omega C e_d) \quad (14)$$

The equation (7) and the equation (10) are substituted into the equation (14) to obtain the grid-side q-axis current component $$i_q = \sqrt{\frac{3}{2}} \frac{U_m}{1 - \omega^2 CL}\left[\omega C \cos(\theta - \omega t) + \frac{3m^2 \cos\varphi \sin(\varphi + \theta - \omega t)}{2R(1 - \omega^2 CL)}\right] \quad (15)$$

In a similar way, when a grid-side q-axis current change rate is $$\frac{di_q}{dt} = 0$$

and a main circuit d-axis voltage change rate is $$\frac{dv_d}{dt} = 0,$$

the equation (12) is changed into $$\begin{cases} e_q - v_q = \omega L i_d \\ i_d - i_{id} = -\omega C v_q \end{cases} \quad (16)$$

According to the equation (16), a grid-side d-axis current component can be obtained through reorganization as $$i_d = \frac{1}{1 - \omega^2 CL}(i_{id} - \omega C e_q) \quad (17)$$

The equation (7) and the equation (10) are substituted into the equation (16) to obtain the grid-side d-axis current component $$i_d = \sqrt{\frac{3}{2}} \frac{U_m}{1 - \omega^2 CL} g \quad (18)$$

$$\left[\omega C \sin(\theta - \omega t) + \frac{3m^2 \cos\varphi \cos(\varphi + \theta - \omega t)}{2R(1 - \omega^2 CL)}\right]$$

According to a three-phase circuit instantaneous power theory, input-side active and reactive power may be represented as $$\begin{bmatrix} P_s \\ Q_s \end{bmatrix} = \begin{bmatrix} e_d & e_q \\ e_q & -e_d \end{bmatrix}\begin{bmatrix} i_d \\ i_q \end{bmatrix} \quad (19)$$

where $P_s$ denotes active power, and $Q_s$ denotes reactive power. The equation (7), the equation (15) and the equation (18) are substituted into the equation (19) so that instantaneous reactive power $Q_s$ of an input side of a matrix rectifier can be obtained, which is shown in the equation (20).

$$Q_s = e_q i_d - e_d i_q \quad (20)$$

$$= -\frac{3}{2}\frac{U_m^2}{1 - \omega^2 CL}\left[\omega C + \frac{3m^2 \cos\varphi \sin\varphi}{2R(1 - \omega^2 CL)}\right]$$

Thus, reactive power of a first converter is:

$$Q_{s1} = -\frac{3}{2}\frac{U_m^2}{1 - \omega^2 CL}\left[\omega C + \frac{3m^2 \cos\varphi \sin\varphi}{2R(1 - \omega^2 CL)}\right]$$

R denotes an output-side load; and $Q_{s1}$ denotes reactive power of the first converter.

(2) According to the above phase difference, a required rotating phase angle of a space current vector of an $(i+1)^{th}$ converter is calculated. By the required rotating phase angle, total instantaneous reactive power at input sides of the $i^{th}$ converter and the $(i+1)^{th}$ converter is zero.

It can be seen from the equation (20) that the reactive power is mainly related to C and φ. Thus, a space current vector of a second converter is rotated to change θ, thereby changing φ; and then, the phase of an input-side voltage and current of the second converter is changed, accordingly, flexible reactive compensation is realized, and meanwhile the system can reach the unit power factor.

Figure 4:
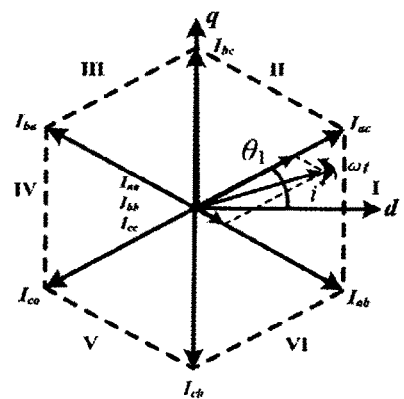
FIG. 4 is a sector division and current vector diagram according to an example of the present disclosure.

A space vector of the first converter in the system is shown in FIG. 4.

$θ_1$ is an included angle between the rotating coordinate system and an a-axis, which periodically changes and is the same with a Phase A voltage phase in a three-phase voltage.

Figure 5:
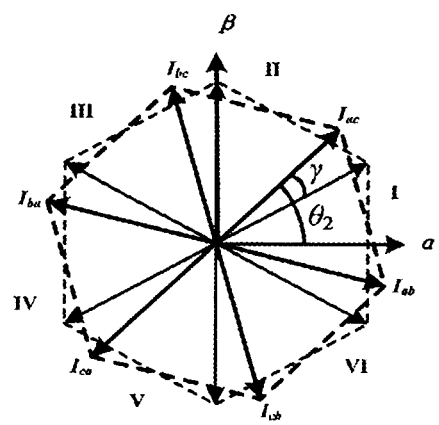
FIG. 5 is a sector division and current vector diagram after rotation according to an example of the present disclosure.

Then, a space vector of the second converter is anticlockwise rotated by γ, which is shown in FIG. 5.

After rotation, $θ_2$ of the second converter is ahead of $θ_1$ by γ, which is equivalent to reduction by γ on the basis of φ, and thus, the reactive power of the second converter may be represented as $$Q_{s2} = -\frac{3}{2}\frac{U_m^2}{1-\omega^2 CL}\left[\omega C + \frac{3m^2 \cos(\varphi - \gamma)\sin\varphi}{2R(1-\omega^2 CL)}\right] \quad (21)$$

where, γ denotes a rotating angle of the space vector of the second converter; only the rotating angle γ and $Q_{s1}$ have differences, and thus, the angle γ can be changed to realize $Q_s = Q_{s1} + Q_{s2}$, and accordingly, the system can achieve flexible reactive power compensation; and when $Q_{s2} = -Q_{s1}$, the parallel system can also realize the unit power factor.

Figure 6:
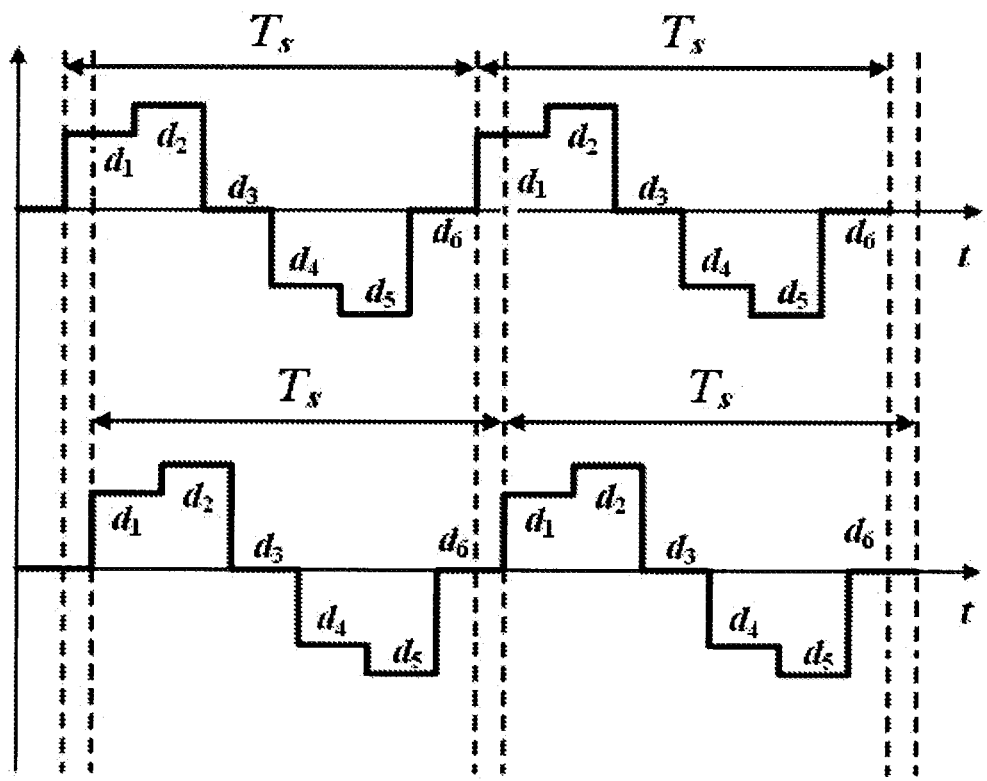
FIG. 6 is a relationship diagram between a carrier wave period and a vector according to an example of the present disclosure.

The space vector of the second converter is rotated, and thus, the action time of the calculated space current vector is ahead of that of the space current vector of the first converter, as shown in FIG. 6, which will cause a two-way switch in the three-phase/single-phase AC-DC matrix converter to be turned on or turned off in advance, resulting in deviation of the system grid-side voltage and current phase.

Thus, a carrier wave of the second converter is delayed and restrained from influencing the grid-side voltage and current phase.

(3) The space current vector of the $(i+1)^{th}$ converter is correspondingly rotated, and a sector to which the rotated space current vector belongs is judged.

(4) A corresponding control pulse signal is generated based on the corresponding sector and modulation ratio, so as to act on the $(i+1)^{th}$ converter to realize power compensation.

The control pulse signal is generated based on a method for modulating a bipolar current space vector. Accordingly, the two-way switch of the three-phase/single-phase AC-DC matrix converter is driven. The beneficial effects of the example are checked through software simulation.

MTLAB/simulink2020a is selected as simulation software, and simulation parameters are shown in Table 1.

TABLE 1

Simulation parameters

| Parameters | HFLMC-1 | HFLMC-2 |
|---|---|---|
| Power grid voltage effective value $e_{abc}$ | 220 V | |
| Power grid frequency f | 50 Hz | |
| Damping resistance R | 10 Q | |
| Switching frequency fs | 10 kHz | |
| Sampling frequency | 10 kHz | |
| Transformer turns ratio n | 1:1 | |
| Transformer leakage inductance $L_{lk}$ | 2 uH | |
| Input filter inductance L | 1 mH | |
| Input filter capacitance C | 75 uF | |
| Output filter inductance $L_{dc}$ | 2 mH | |
| Output filter capacitance $C_{dc}$ | 47 uF | |

Figure 7A:
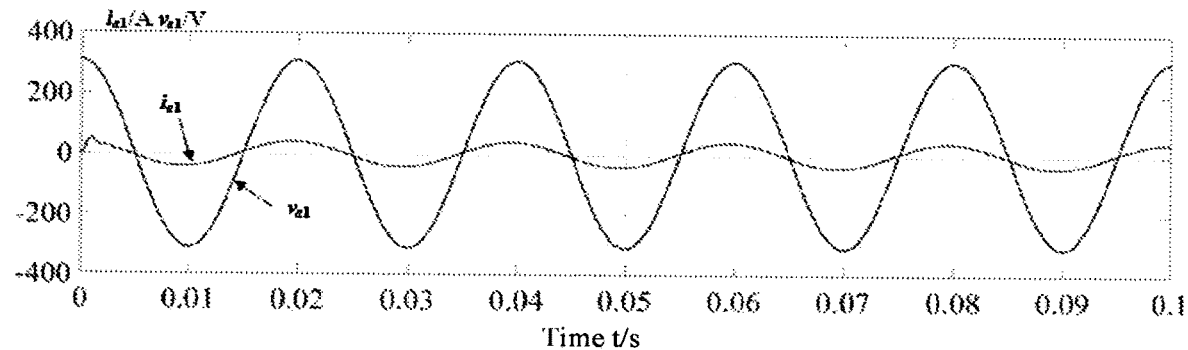
FIG. 7 ($a$) is an input-side Phase A voltage and current of a first converter after rotation according to an example of the present disclosure.
Figure 7B:
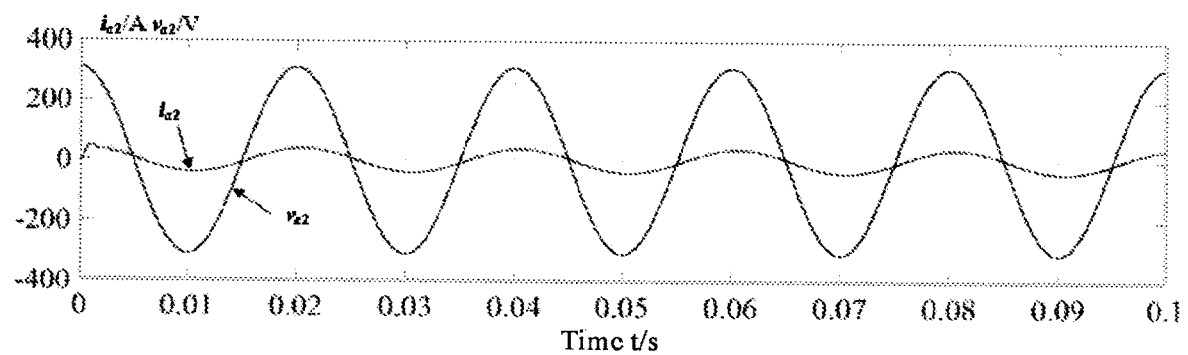
Figure 8:
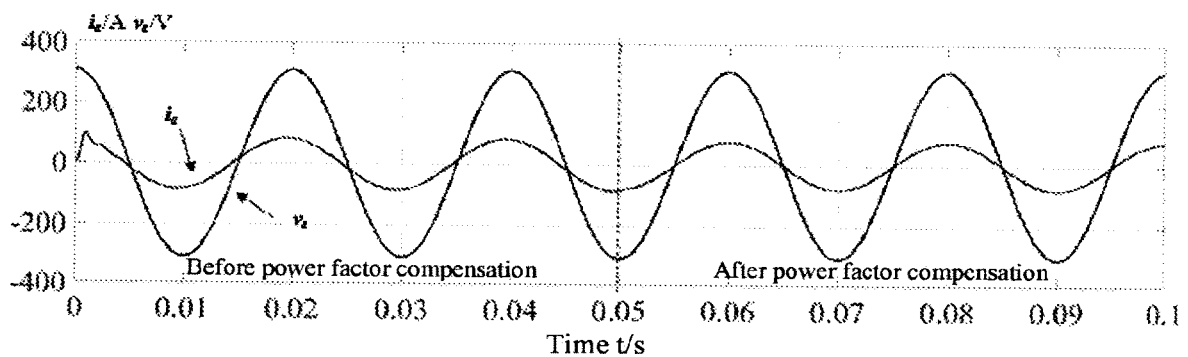
FIG. 8 is a system grid-side input Phase A voltage and current waveform according to an example of the present disclosure.

FIG. 7 (a) and FIG. 7 (b) illustrate an input-side Phase A voltage and current of the first converter after rotation and an input-side Phase A voltage and current of the second converter after rotation according to the example; and FIG. 8 illustrates a system grid-side input Phase A voltage and current waveform according to the example. It can be known from the above simulation result that the power compensation control method in the example can flexibly change the phase difference of the system grid-side voltage and current, which makes the phase the same rapidly, thereby completing power compensation dynamic control and achieving the unit power factor.

Example II

The example provides a power compensation control apparatus for a high-power multi-functional efficient charging system. A topology structure of the charging system is constituted by at least two parallel high frequency link matrix converters. The power compensation control apparatus includes:

(1) A phase difference calculation module configured to calculate, under a dq two-phase synchronous rotating coordinate system, a difference between an input voltage phase of an $i^{th}$ converter and an ideal reference input current phase, where i is an odd number;

as an implementation, according to a transformation matrix through which an abc three-phase static coordinate system is converted into the dq two-phase synchronous rotating coordinate system, the difference between the input voltage phase of the $i^{th}$ converter and the ideal reference input current phase is calculated. A Phase A of the input voltage of the $i^{th}$ converter is an included angle between a d-axis of the dq two-phase synchronous rotating coordinate system and an a-axis of the abc three-phase static coordinate system. The included angle between the d-axis of the dq two-phase synchronous rotating coordinate system and the a-axis of the abc three-phase static coordinate system is obtained through phase locking via a phase-locked loop.

(2) A vector rotating module configured to calculate, according to the above phase difference, a required rotating phase angle of a space current vector of an $(i+1)^{th}$ converter. By the required rotating phase angle, total instantaneous reactive power at input sides of the $i^{th}$ converter and the $(i+1)^{th}$ converter is zero.

(3) A sector judgment module configured to correspondingly rotate the space current vector of the $(i+1)^{th}$ converter, and judge a sector to which the rotated space current vector belongs.

(4) A pulse modulation module configured to generate a corresponding control pulse signal based on the corresponding sector and modulation ratio, so as to act on the $(i+1)^{th}$ converter to realize power compensation.

In the specific implementation process, the pulse modulation module generates the control pulse signal based on a method for modulating a bipolar current space vector.

Herein, it is to be explained that, various modules in the example and the steps in Example I are in one-to-one correspondence and are the same in specific implementation process which is not repeated herein.

The power compensation control method for a high-power multi-functional efficient charging system according to the present disclosure can be described with reference to storable computer programs. The present disclosure is described with reference to the flowcharts and/or the block diagrams of the method, the device (system), and a computer program product according to the examples of the present disclosure. It is to be understood that computer program instructions can implement each procedure and/or block in the flowcharts and/or the block diagrams and a combination of procedures and/or blocks in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The foregoing descriptions are merely preferred examples of the present disclosure, but are not intended to limit the present disclosure. A person skilled in the art may make various alterations and variations to the present disclosure. Any modification, equivalent replacement, or improvement made and the like within the spirit and principle of the present disclosure shall fall within the protection scope of the present disclosure.

What is claimed is:

1. A power compensation control method for a high-power multi-functional efficient charging system, wherein a topology structure of the charging system is constituted by at least two parallel high frequency link matrix converters, and the power compensation control method comprises:
   calculating a difference between an input voltage phase of an $i^{th}$ converter and an ideal reference input current phase under a dq two-phase synchronous rotating coordinate system, where i is an odd number;
   calculating, according to the above phase difference, a required rotating phase angle of a space current vector of an $(i+1)^{th}$ converter, wherein by the required rotating phase angle, total instantaneous reactive power at input sides of the $i^{th}$ converter and the $(i+1)^{th}$ converter is zero;
   correspondingly rotating the space current vector of the $(i+1)^{th}$ converter, and judging a sector to which the rotated space current vector belongs; and
   generating a corresponding control pulse signal based on the corresponding sector and modulation ratio, so as to act on the $(i+1)^{th}$ converter to realize power compensation.

2. The power compensation control method for a high-power multi-functional efficient charging system according to claim 1, wherein according to a transformation matrix through which an abc three-phase static coordinate system is converted into a dq two-phase synchronous rotating coordinate system, the difference between the input voltage phase of the $i^{th}$ converter and the ideal reference input current phase is calculated.

3. The power compensation control method for a high-power multi-functional efficient charging system according to claim 2, wherein a Phase A of the input voltage of the $i^{th}$ converter is an included angle between a d-axis of the dq two-phase synchronous rotating coordinate system and an a-axis of the abc three-phase static coordinate system.

4. The power compensation control method for a high-power multi-functional efficient charging system according to claim 3, wherein the included angle between the d-axis of the dq two-phase synchronous rotating coordinate system and the a-axis of the abc three-phase static coordinate system is obtained through phase locking via a phase-locked loop.

5. The power compensation control method for a high-power multi-functional efficient charging system according to claim 1, wherein a Phase A of the input voltage of the $i^{th}$ converter is an included angle between a d-axis of the dq two-phase synchronous rotating coordinate system and an a-axis of the abc three-phase static coordinate system.

6. The power compensation control method for a high-power multi-functional efficient charging system according to claim 5, wherein the included angle between the d-axis of the dq two-phase synchronous rotating coordinate system and the a-axis of the abc three-phase static coordinate system is obtained through phase locking via a phase-locked loop.

7. The power compensation control method for a high-power multi-functional efficient charging system according to claim 5, wherein the control pulse signal is generated based on a method for modulating a bipolar current space vector.

8. The power compensation control method for a high-power multi-functional efficient charging system according to claim 3, wherein the control pulse signal is generated based on a method for modulating a bipolar current space vector.

9. The power compensation control method for a high-power multi-functional efficient charging system according to claim 1, wherein the control pulse signal is generated based on a method for modulating a bipolar current space vector.

10. A power compensation control apparatus for a high-power multi-functional efficient charging system, wherein a topology structure of the charging system is constituted by at least two parallel high frequency link matrix converters, and the power compensation control apparatus comprises:
    a phase difference calculation module configured to calculate, under a dq two-phase synchronous rotating coordinate system, a difference between an input voltage phase of an $i^{th}$ converter and an ideal reference input current phase, where i is an odd number;
    a vector rotating module configured to calculate, according to the above phase difference, a required rotating phase angle of a space current vector of an $(i+1)^{th}$ converter, wherein by the required rotating phase angle, total instantaneous reactive power at input sides of the $i^{th}$ converter and the $(i+1)^{th}$ converter is zero;
    a sector judgment module configured to correspondingly rotate the space current vector of the $(i+1)^{th}$ converter, and judge a sector to which the rotated space current vector belongs; and
    a pulse modulation module configured to generate a corresponding control pulse signal based on the corresponding sector and modulation ratio, so as to act on the $(i+1)^{th}$ converter to realize power compensation.

11. The power compensation control apparatus for a high-power multi-functional efficient charging system according to claim 10, wherein according to a transformation matrix through which an abc three-phase static coordinate system is converted into a dq two-phase synchronous rotating coordinate system, the difference between the input voltage phase of the $i^{th}$ converter and the ideal reference input current phase is calculated.

12. The power compensation control apparatus for a high-power multi-functional efficient charging system according to claim 11, wherein a Phase A of the input voltage of the $i^{th}$ converter is an included angle between a d-axis of the dq two-phase synchronous rotating coordinate system and an a-axis of the abc three-phase static coordinate system.

13. The power compensation control apparatus for a high-power multi-functional efficient charging system according to claim 12, wherein the included angle between the d-axis of the dq two-phase synchronous rotating coordinate system and the a-axis of the abc three-phase static coordinate system is obtained through phase locking via a phase-locked loop.

14. The power compensation control apparatus for a high-power multi-functional efficient charging system according to claim 12, wherein the pulse modulation module generates the control pulse signal based on a method for modulating a bipolar current space vector.

15. The power compensation control apparatus for a high-power multi-functional efficient charging system according to claim 10, wherein a Phase A of the input voltage of the it converter is an included angle between a d-axis of the dq two-phase synchronous rotating coordinate system and an a-axis of the abc three-phase static coordinate system.

16. The power compensation control apparatus for a high-power multi-functional efficient charging system according to claim 15, wherein the included angle between the d-axis of the dq two-phase synchronous rotating coordinate system and the a-axis of the abc three-phase static coordinate system is obtained through phase locking via a phase-locked loop.

17. The power compensation control apparatus for a high-power multi-functional efficient charging system according to claim 15, wherein the pulse modulation module generates the control pulse signal based on a method for modulating a bipolar current space vector.

18. The power compensation control apparatus for a high-power multi-functional efficient charging system according to claim 10, wherein the pulse modulation module generates the control pulse signal based on a method for modulating a bipolar current space vector.

* * * * *